United States Patent

Wood

[15] 3,690,051
[45] Sept. 12, 1972

[54] SAFETY LAWNMOWER BLADE

[72] Inventor: John W. Wood, 606 Meadow Ridge Rd., Baltimore, Md. 21204

[73] Assignee: The Black and Decker Manufacturing Company, Towson, Md.

[22] Filed: Dec. 28, 1971

[21] Appl. No.: 213,039

[52] U.S. Cl. .................................................56/295
[51] Int. Cl. ..............................................A01d 55/18
[58] Field of Search......56/295, 256, 255, 17.5, 13.5, 56/13.6, 235; 30/276, 263, 240

[56] References Cited

UNITED STATES PATENTS

| 2,697,323 | 12/1954 | Horn | 56/295 |
| 2,716,323 | 8/1955 | Ford | 56/295 |
| 3,399,519 | 9/1968 | Buchanan | 56/295 |
| 3,621,642 | 11/1971 | Leake, Jr. | 56/295 |

FOREIGN PATENTS OR APPLICATIONS

| 221,980 | 6/1959 | Australia | 56/295 |
| 1,519,808 | 2/1968 | France | 56/295 |

*Primary Examiner*—Russell R. Kinsey
*Attorney*—Leonard Bloom

[57] ABSTRACT

A lawnmower blade construction comprising a disc having a plurality of radially disposed cutting blades pivoted thereto. The blades are positioned for cutting by centrifugal force but are pivotally retractable should they strike an obstruction. Novel means is provided to retain the blades in a retracted and non-cutting position after striking an obstruction to reduce the likelihood of serious injury to a user and of damage to the mower or blade.

10 Claims, 10 Drawing Figures

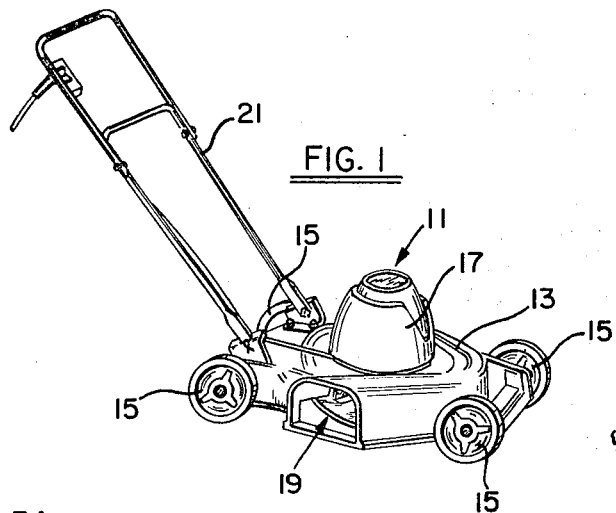
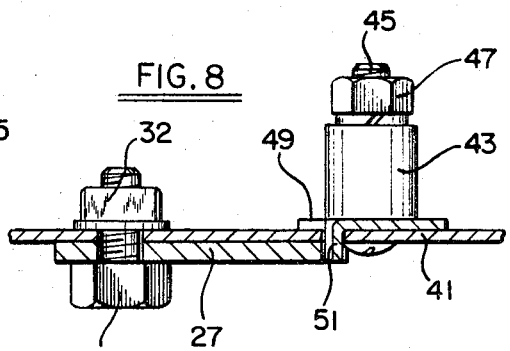
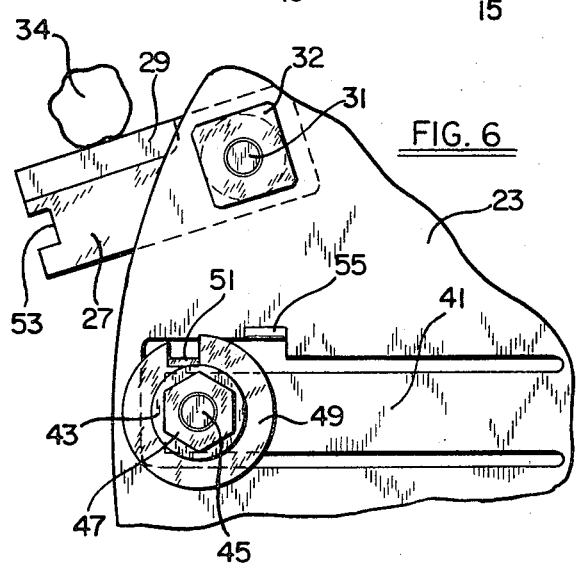
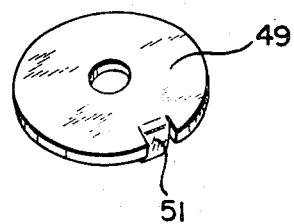
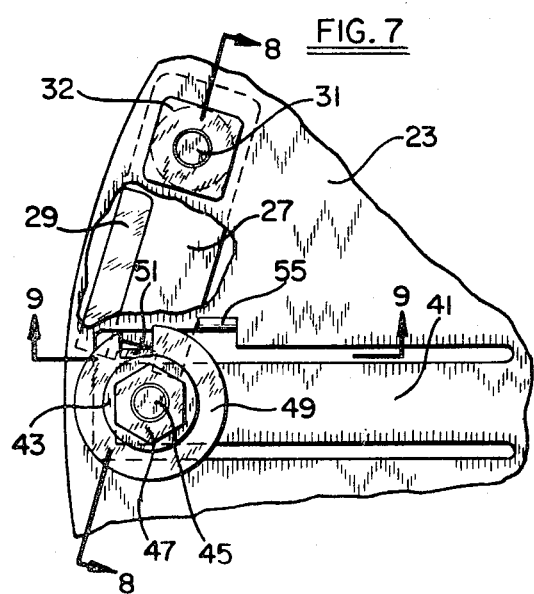
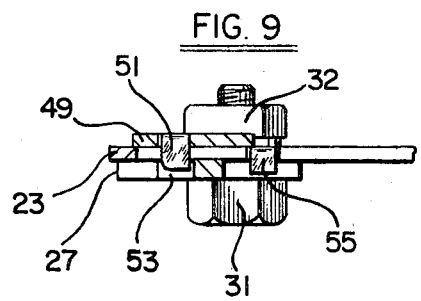
INVENTOR.
JOHN W. WOOD

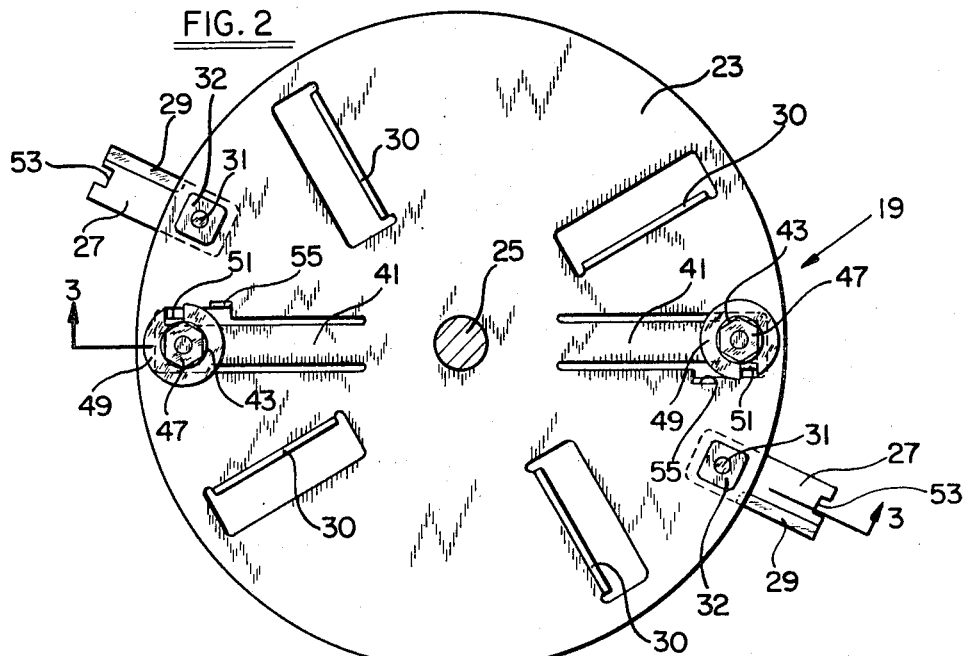
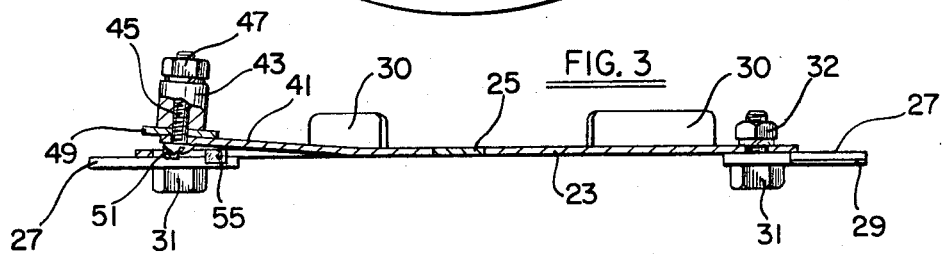
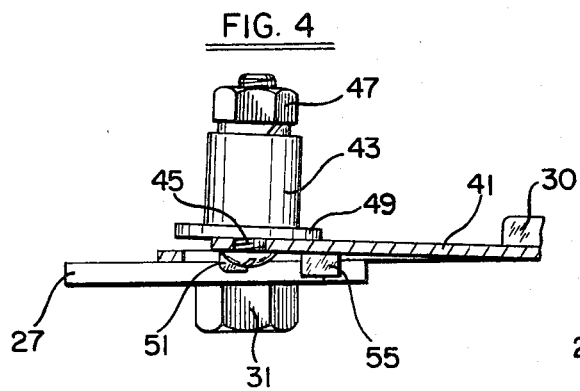
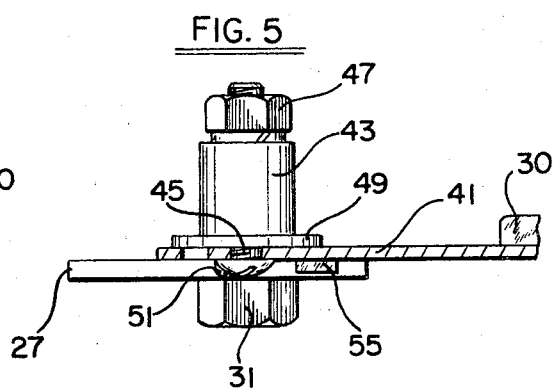

SAFETY LAWNMOWER BLADE

SUMMARY OF THE INVENTION

The present invention is directed to a novel pivoted blade and latch construction for a rotary lawnmower. The inventive construction facilitates ready pivotal retraction of a mower blade from a cutting to a non-cutting position should the blade strike an obstruction during use. Importantly, the blade is retained in this retracted position as long as the mower continues operating at or near normal speed, and is automatically released and repositioned for cutting when the mower is stopped or is slowed considerably (e.g. to less than half speed). This insures that the blade will not continue to strike the obstruction in the event the mower or obstruction is not or cannot be moved, and allows the blade to be automatically repositioned for cutting after the mower or obstruction is moved and without requiring the operator to turn the mower over or to insert his hand into a dangerous area.

Main objects of the present invention, therefore, are to provide an improved pivoted blade and latch construction for a rotary lawnmower wherein the blade retracts from the normal cutting position when it strikes an obstruction and is retained in the retracted position to prevent the blade from continuing to strike the obstruction, and wherein the blade latch is released automatically when the blade rotational speed falls to or below a preselected level.

Further objects of the present invention are to provide an improved pivoted blade and latch construction of the above character which embodies simplicity and utilizes a minimum of separate parts and is therefore relatively inexpensive, and which, in addition, is rugged in construction and reliable in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a perspective view illustrating a rotary lawnmower embodying the present invention;

FIG. 2 is a plan view illustrating the mower blade and latch construction of the present invention and showing the position of the parts for normal cutting and the blade assembly at rest;

FIG. 3 is a sectional view of FIG. 2 taken along the line 3—3 thereof;

FIG. 4 is an enlarged view of a portion of FIG. 3:

FIG. 5 is a view similar to FIG. 4 and showing the position of the parts when the blade assembly is rotating at normal operating speed;

FIG. 6 is an enlarged plan view of a portion of the blade and latch assembly shown in FIG. 2 and showing the position of the parts when the blade strikes an obstruction;

FIG. 7 is a view similar to FIG. 6 and showing the blade fully retracted and latched;

FIG. 8 is a sectional view of FIG. 7 taken along the line 8—8 thereof;

FIG. 9 is a sectional view of FIG. 7 taken along the line 9—9 thereof; and

FIG. 10 is a perspective view illustrating the latch washer of the present invention.

BROAD STATEMENT OF THE INVENTION

Broadly described, the present invention relates to a pivoted blade and latch construction for a rotary lawnmower of the type which includes a housing supported for movement over the ground, a prime mover on said housing, a rotary member supported by said housing and driven by said prime mover, the improvement which comprises a plurality of blades pivoted to said rotary member, said blades being normally positioned for cutting upon rotation of said member and being retractable from said cutting position upon striking an obstruction, cooperable latch means on said blades and said rotary member adapted to retain said blades in the retracted position, said latch means being automatically releasable upon substantial reduction in the rotational speed of said rotary member.

In another aspect, the present invention relates to a rotary cutting blade assembly comprising a power driven, rotary body, a cutting blade movably mounted on said body for movement from an extended cutting position to a retracted non-cutting position, said blade being movable to said cutting position by centrifugal force and to said non-cutting position by impact against an object, latch means on said body and movable from a latching to a releasing position, said latch means being movable to said latching position by centrifugal force and being normally biased toward said releasing position, whereby said blade is moved to non-cutting position upon striking an object and is retained there by said latch means during normal rotation of said rotary body, and whereby said latch means moves toward said releasing position when the speed of rotation of said rotary body slows to a preselected level, whereupon said blade is movable to said cutting position.

DETAILED DESCRIPTION

Referring now more specifically to the drawings, a rotary lawnmower embodying the present invention is illustrated generally at 11 in FIG. 1 and is seen to include a housing 13 supported for movement over the ground by wheels 15. A prime mover 17 is supported atop the housing 13 and rotates a cutting blade assembly 19 disposed beneath the housing 13. An upstanding handle 21 is fixed to the housing 13 and provides for control and manipulation of the mower 11.

The rotary blade assembly 19 is seen in FIGS. 2 and 3 to include a circular disc 23 fixed to a motor driven shaft 25. A plurality of blades 27 each having a sharpened leading edge 29 are pivoted to the disc 23 by a pivot bolt 31 and nut 32 and are adapted to extend radially outwardly of the disc 23 as shown. A plurality of fins 30 may be provided on the disc 23 to generate an updraft of air to facilitate efficient cutting. When the disc 23 rotates, the blades 27 are held in the radially extended position by centrifugal force. However, when the blades 27 strike an obstruction, such as is shown at 34 in FIG. 6, the blades 27 are free to pivot rearwardly or counterclockwise about their pivot bolts 31.

It will be appreciated that without any structure to prevent same, the blades 27 will pivot back to the extended position after they pass the obstruction 34 for so long as the disc 23 continues to rotate. Thus, if the obstruction 34 is not removed from the blade path, the blades 27 will continue to strike the obstruction with resultant damage or injury to the blades 27, the mower, and/or the obstruction 34.

In accordance with the present invention, a novel latch is provided to retain the blades 27 in their retracted position once they are moved there, and for so long as the mower continues to operate and the blade assembly continues to rotate at or near normal speed. This novel latch, however, is constructed to automatically release the blades 27 and allow them to move back to the extended, cutting position once the blade assembly 19 is stopped or its speed is reduced substantially. This reduction in speed should be such as to require a positive act on the part of the operator to thereby assure that the blade assembly is free from the obstruction. By way of example, it is suggested that the rotational speed of the blade assembly 19 be reduced to below 50% its normal operating speed in order for automatic release of the blades 27 to occur. At this point, then, the blades 27 are reset for cutting automatically without any need for placing any tool, object, or the operator's hand near the blade path.

The novel latch is seen to include a finger 41 struck out from the disc 23 and located behind each blade 27. Each finger 41 extends radially of the disc 23 and is bent upwardly from the plane thereof and has a weight 43 secured to its outer, unsupported end by a bolt 45 and a nut 47. The length and resiliency of the fingers 41, and the mass of the weights 43 is selected so that above a preselected rotational speed of the disc 23, centrifugal force acting on the weights 43 is sufficient to bend the fingers 41 downwardly into the plane of the disc 23 (see FIG. 5). When the rotational speed of the disc 23 falls below that preselected level, the fingers 41 flex upwardly to the position shown in FIG. 4.

Each of the bolts 45 has a catch washer 49 thereon trapped between the weight 43 and the finger 41. Each washer 49 has a catch 51 struck downwardly therefrom and aligned with a gap 52 between the associated finger 41 and the disc 23 so as to extend below the plane of the disc 23 when the fingers 41 are in that plane, as shown in FIGS. 5 and 9. The washers 49 are of a sufficient diameter to engage the disc 23 and limit downward movement of the fingers 41.

Each of the blades 27 is formed with a notch 53 adapted to cooperatively receive a respective one of the catches 51 when the fingers 41 are in the position shown in FIGS. 5 and 9, and the blades 27 are pivoted rearwardly about bolts 31. This occurs when the disc 23 is rotating at or near its normal operating speed and the blades 27 strike an obstruction, and causes the blades 27 so struck and pivoted to be retained in a retracted, non-cutting position as shown in FIG. 7. The leading edge of the catch 51 may be rounded, as shown, to facilitate a camming action between itself and the blade 27 during initial contact. The flexibility at the fingers 41 allows them to lift momentarily for entry of the catch 51 into the blade notch 53. A stop 55 depends downwardly from the disc 23 adjacent each finger 41 and extends below the catch 51 to prevent further rearward pivotal movement of the blades 27 past the position shown in FIG. 7. When the rotational speed of the disc 23 falls below the preselected level, the fingers 41 flex upwardly and release the blades 27 for movement back to the normal cutting position.

In use, the blades 27 are normally extended ready for cutting under the action of centrifugal force. When the rotational speed of disc 23 increases and exceeds the specified predetermined level, for example, 50% of normal operating speed, centrifugal force on weights 43 causes the fingers 41 to flex from the FIG. 4 to the FIG. 5 position. The blades 27, however, continue normal cutting until one or more of them strikes a fairly stiff obstruction as shown at 34 in FIG. 6. When this occurs and a sufficiently strong tangential force is directed against the struck blade or blades 27, the blade or blades 27 so struck pivot rearwardly and are "caught" by the catch 51 which is cooperatively received in the blade recess 53. The blade or blades 27 are retained in this retracted position and cannot again strike the obstruction until the rotational speed of the disc 23 is reduced below the predetermined level, for example, below 50% of its normal operating speed. This requires a positive act on the part of the operator (to close the throttle if the mower is powered by a gasoline engine, or to open the switch if an electric motor is employed). This is obviously advantageous and safe both to the operator and to the mower and its components.

Furthermore, since the latch is released and the blades 27 re-extended for cutting automatically, the operator is not required to insert his hand or a tool to release the blades 27 for cutting. This too, has obvious safety benefits.

By the foregoing, there has been disclosed an improved pivoted blade and latch construction for a rotary lawnmower calculated to fulfill the inventive objects set forth, and while a preferred embodiment has been illustrated and described in detail, various additions, substitutions, modifications and omissions may be made thereto without departing from the spirit of the invention.

I claim,

1. In a pivoted blade and latch construction for a rotary lawnmower of the type which includes a housing supported for movement over the ground, a prime mover on said housing, a rotary member supported by said housing and driven by said prime mover; the improvement which comprises a plurality of blades pivoted to said rotary member, said blades being normally positioned for cutting upon rotation of said member and being retractable from said cutting position upon striking an obstruction, cooperable latch means on said blades and said rotary member adapted to retain said blades in the retracted position, said latch means being automatically releasable upon substantial reduction in the rotational speed of said rotary member.

2. The improvement as defined in claim 1 wherein each said latch means includes means on said rotary member normally disposed in a releasing position and being movable by centrifugal force to a blade retaining position.

3. The improvement as defined in claim 2 wherein each said movable latch means includes resilient means normally biasing it to said releasing position.

4. The improvement of claim 2 wherein said movable latch means includes a resilient finger having a free end provided with a blade engaging latch member and normally disposed in said releasing position, said finger having a weight thereon operable by centrifugal force to move said free end to said blade retaining position.

5. The improvement as defined in claim 4 wherein each said latch member and each said blade includes cam means allowing engagement of said blade and latch member when said rotary member is rotating at or near its normal operating speed and said blade strikes an obstruction.

6. The improvement as defined in claim 1 wherein said latch means includes a generally radially extending, flexible finger cantilever mounted on said rotating body behind each said blade, each said finger being weighted near its outer end to cause it to flex under centrifugal force and including a latch member engageable with its associated blade when said finger is flexed and said blade is retracted, said latch member being releasable from its associated blade when the rotational speed of said rotary member falls below a preselected level.

7. The improvement as defined in claim 6 wherein each said blade is notched to receive the latch member of the associated finger.

8. The improvement as defined in claim 6 wherein each said flexible finger is bent upwardly from the plane of the blades, said fingers being bendable downwardly under centrifugal force to bring said weighted ends generally into the plane of said blades when said rotating body exceeds said preselected speed, said latch member projecting below said finger.

9. A rotary cutting blade assembly comprising a power driven, rotary body, a cutting blade movably mounted on said body for movement from an extended cutting position to a retracted non-cutting position, said blade being movable to said cutting position by centrifugal force and to said non-cutting position by impact against an object, latch means on said body and movable from a latching to a releasing position, said latch means being movable to said latching position by centrifugal force and being normally biased toward said releasing position, whereby said blade is moved to non-cutting position upon striking an object and is retained there by said latch means during normal rotation of said rotary body, and whereby said latch means moves toward said releasing position when the speed of rotation of said rotary body slows to a preselected level, whereupon said blade is movable to said cutting position.

10. An assembly as defined in claim 9 wherein said latch means includes a cantilever mounted, flexible finger behind said blade and integral with said body, said finger being normally bent away from said blade, and being bendable toward said blade under centrifugal force.

* * * * *